(12) United States Patent
Horibe et al.

(10) Patent No.: US 8,422,715 B2
(45) Date of Patent: Apr. 16, 2013

(54) MICROPHONE UNIT

(75) Inventors: Ryusuke Horibe, Daito (JP); Rikuo Takano, Daito (JP); Fuminori Tanaka, Daito (JP); Takeshi Inoda, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 393 days.

(21) Appl. No.: 12/719,486

(22) Filed: Mar. 8, 2010

(65) Prior Publication Data

US 2010/0226522 A1    Sep. 9, 2010

(30) Foreign Application Priority Data

Mar. 9, 2009    (JP) .................................. 2009-055605

(51) Int. Cl.
*H04R 25/00*    (2006.01)

(52) U.S. Cl.
USPC ........................... 381/356; 381/355; 381/357

(58) Field of Classification Search .................... 381/92, 381/313, 328, 355, 356, 357, 358, 360, 361, 381/369, 174; 379/420.03, 433.03
See application file for complete search history.

(56) References Cited

U.S. PATENT DOCUMENTS

| | | | |
|---|---|---|---|
| 3,770,911 A | 11/1973 | Knowles et al. | |
| 4,850,016 A * | 7/1989 | Groves et al. | 379/433.03 |
| 5,226,076 A | 7/1993 | Baumhauer, Jr. et al. | |
| 5,703,957 A * | 12/1997 | McAteer | 381/92 |
| 6,151,399 A | 11/2000 | Killion et al. | |
| 6,831,987 B2 * | 12/2004 | Killion et al. | 381/313 |
| 6,885,751 B2 * | 4/2005 | Pribyl | 381/174 |
| 2003/0198359 A1 | 10/2003 | Killion et al. | |

FOREIGN PATENT DOCUMENTS

| | | | |
|---|---|---|---|
| JP | 5-284588 A | 10/1993 | |
| JP | 2002-507334 A | 3/2002 | |
| JP | 2002-537743 A | 11/2002 | |
| JP | 2003-44087 A | 2/2003 | |
| JP | 3620133 B2 | 11/2004 | |
| JP | 2007-180896 A | 7/2007 | |

OTHER PUBLICATIONS

European Search Report dated Jul. 12, 2010 (six (6) pages).

* cited by examiner

*Primary Examiner* — Huyen D Le
(74) *Attorney, Agent, or Firm* — Crowell & Moring LLP

(57) ABSTRACT

A microphone unit comprises a vibratory diaphragm for detecting sound input through its first and second openings. The sound input through the first opening is guided to a front surface of the vibratory diaphragm while the sound input through the second opening is guided to a rear surface of the vibratory diaphragm so as to detect the sound by the vibration of the vibratory diaphragm. The microphone unit satisfies relation $0.76 \leq D/\Delta r \leq 2.0$ where D is difference in time between the sound propagation time from the first opening to the front surface of the vibratory diaphragm and that from the second opening to the rear surface of the vibratory diaphragm, while $\Delta r$ is distance between the first and second openings. The relation $D/\Delta r \leq 2.0$ can reduce far-field noise, while the relation $0.76 \leq D/\Delta r$ can increase the detection sensitivity to sound emitted from a null point.

4 Claims, 9 Drawing Sheets

FIG. 3A  D=0 μs
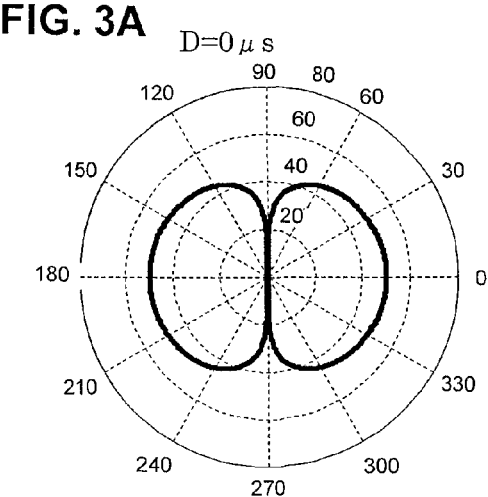
FIG. 3D  D=11.3 μs
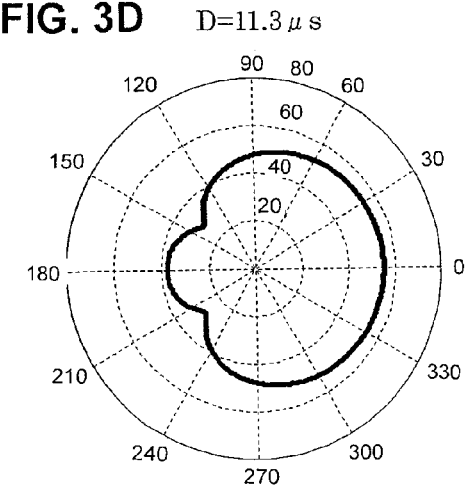
FIG. 3B  D=3.8 μs
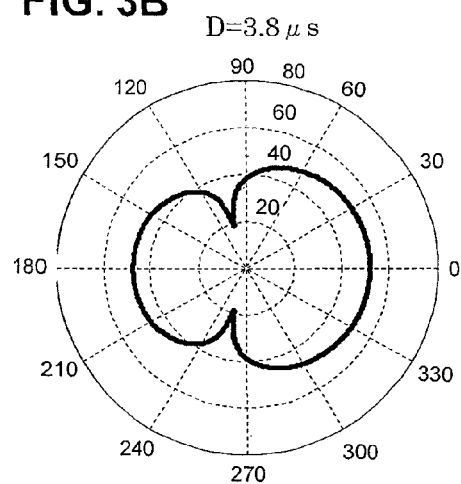
FIG. 3E  D=15.1 μs
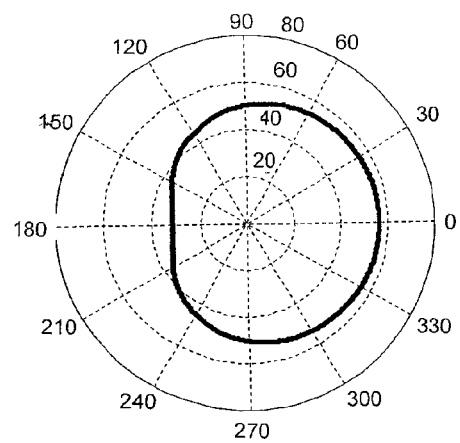
FIG. 3C  D=7.6 μs
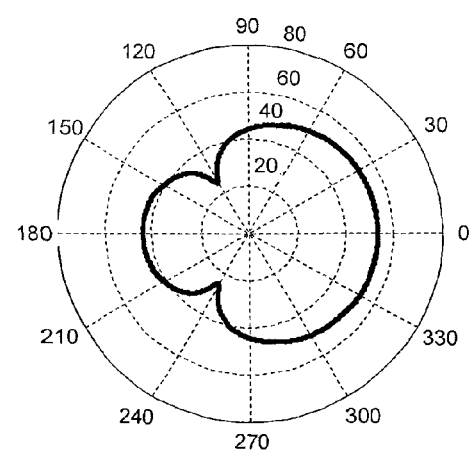
FIG. 3F  D=18.9 μs
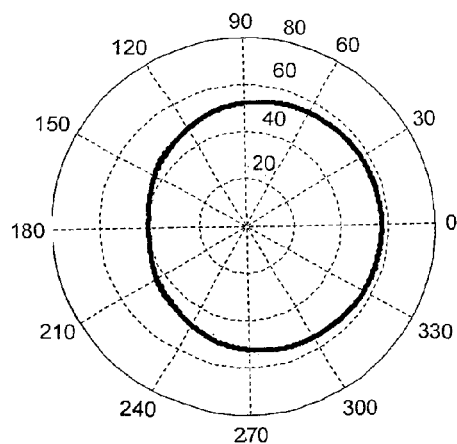

FIG. 4A D=0 μs
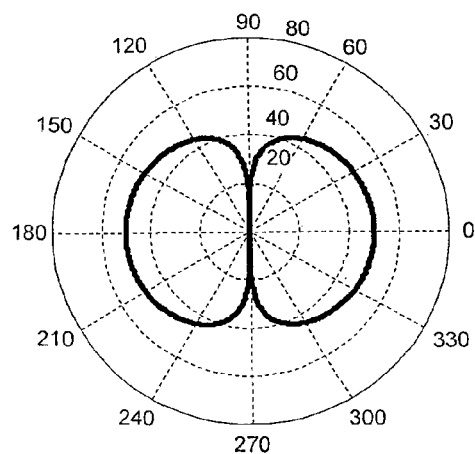
FIG. 4B D=3.8 μs
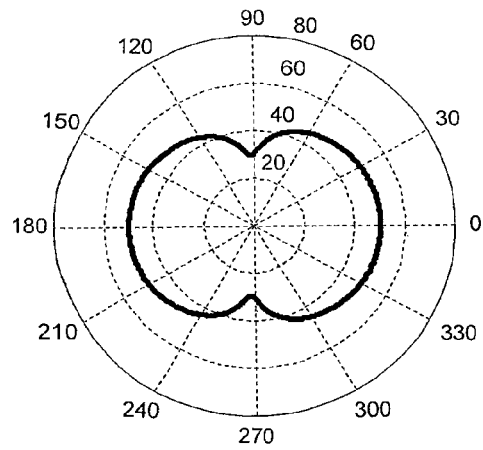
FIG. 4C D=7.6 μs
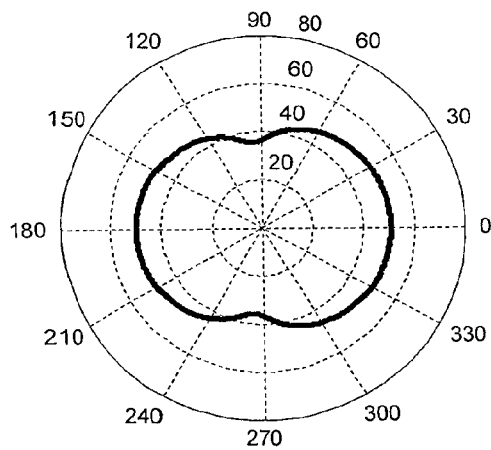
FIG. 4D D=11.3 μs
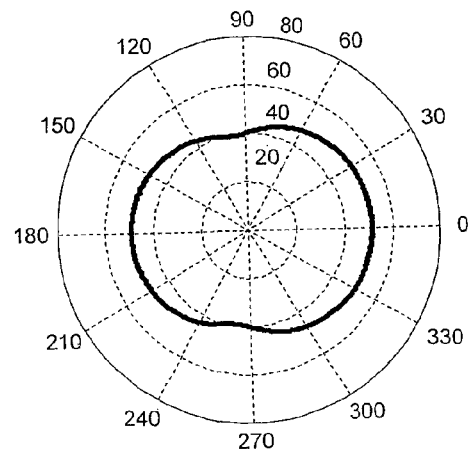
FIG. 4E D=15.1 μs
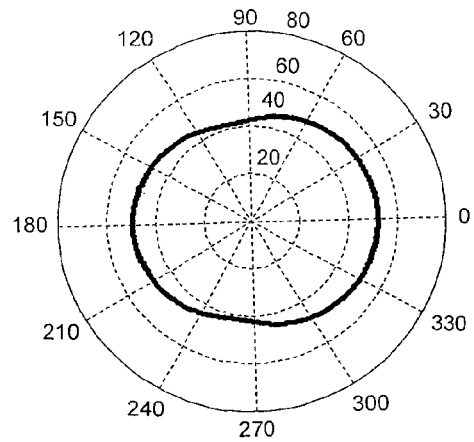
FIG. 4F D=18.9 μs
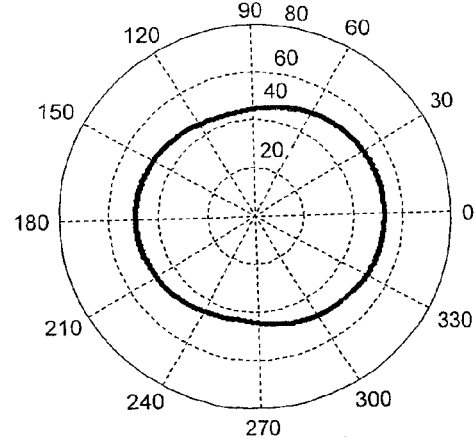

FIG. 10        PRIOR ART
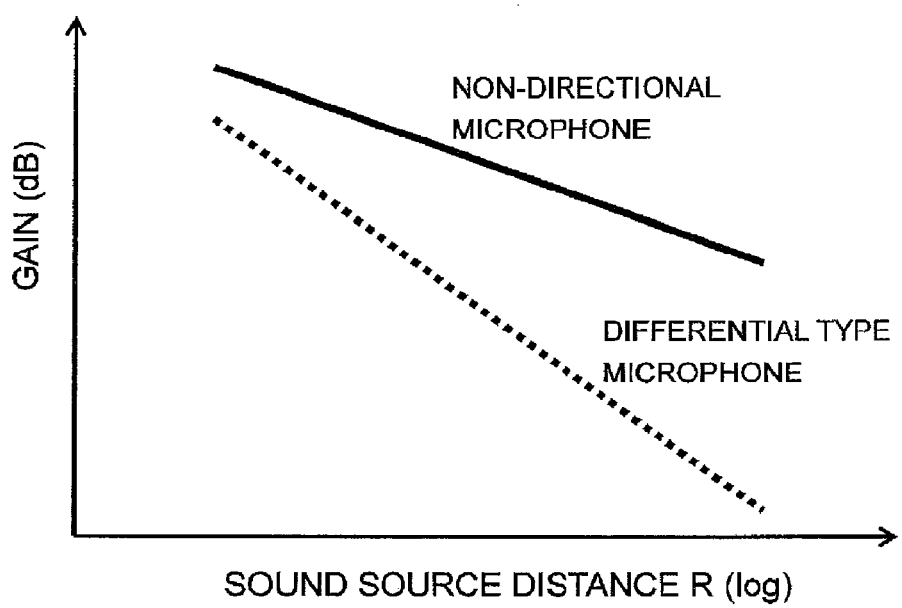
FIG. 11        PRIOR ART
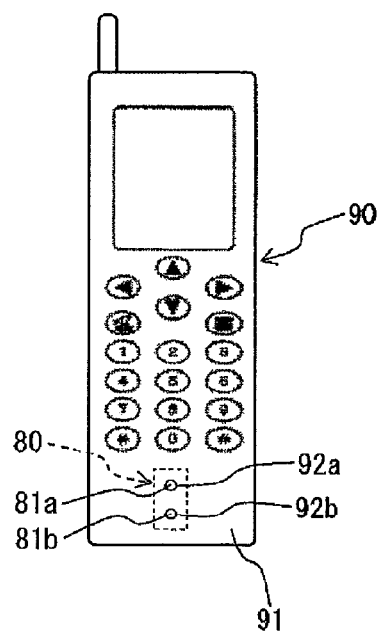

MICROPHONE UNIT

BACKGROUND OF THE INVENTION

1. Field of the Invention

The present invention relates to a microphone unit which detects sound (i.e. vibration of air) and converts the detected sound to an electrical signal as an output signal.

2. Description of the Related Art

A microphone unit having a vibratory diaphragm for detecting sound is known in which sound is guided to front and rear surfaces of the vibratory diaphragm so as to detect the sound by the vibration of the vibratory diaphragm due to a difference between sound pressures on the front and rear surfaces of the vibratory diaphragm (i.e. difference in phase and amplitude between sound waves or vibrating waves of air incident on the front and rear surfaces of the vibratory diaphragm). It is a kind of differential type microphone unit, and has a figure "8" shaped bi-directional characteristics (pattern). Such a microphone unit has an effect to reduce far-field noise (reduce detection sensitivity to detect sound emitted from a far position) as compared with a non-directional (omni-directional) microphone unit which guides sound to only one of the front and rear surfaces of the vibratory diaphragm.

FIG. 10 is a graph showing relationship between sound source distance (position from which the sound is emitted) and detection sensitivity in a differential type microphone unit and a non-directional microphone unit. As apparent from the relationship shown in FIG. 10, the difference between the detection sensitivity to sound emitted from a near position and that emitted from a far position (reduction degree of detection sensitivity to sound emitted from a far position relative to that emitted from a near position) is larger in the case of the differential type microphone than in the case of the non-directional microphone. It can be understood from this that the differential type microphone unit has an effect to reduce far-field noise as compared with the non-directional microphone unit.

Generally, such a differential type microphone unit has a housing and a vibratory diaphragm placed in the housing. The housing has a first opening and a second opening which allow sound to be input therethrough such that the sound input through the first opening is guided to the front surface of the vibratory diaphragm, while the sound input through the second opening is guided to the rear surface of the diaphragm. Now considering positions from which sound is emitted (positions of the sound source) in the conventional differential type microphone unit, there exits a position where the phase of the sound incident on the front surface of the vibratory diaphragm is equal to that on the rear surface of the vibratory diaphragm. Such a position is referred to as a null point.

In the conventional differential type microphone unit, assume a structure that the sound propagation time from the first opening to the front surface of the vibratory diaphragm is equal to that from the second opening to the rear surface of the vibratory diaphragm. Under this assumption, the null point is formed at a position where the sound propagation time from the sound source to the first opening is equal to that to the second opening, namely at a position where the distance from the sound source to the first opening is equal to that to the second opening. Thus, in the conventional differential type microphone unit with the assumed structure, sound emitted from the null point causes a sound wave input through the first opening to be equal to that through the second opening both in phase and amplitude, making the sound wave incident on the front surface of the vibratory diaphragm equal to that incident on the rear surface of the vibratory diaphragm both in phase and amplitude. Thus, in the conventional differential type microphone unit with the assumed structure, the sound emitted from the null point causes the sound pressures on the front and rear surfaces of the vibratory diaphragm to be completely cancelled by each other, preventing the vibration of the vibratory diaphragm and resulting in a zero detection output for the sound emitted from the null point.

When mounted in a product such as a mobile phone, the conventional differential type microphone has an advantage that it can receive a voice of a close talker (user) and reduce far-field noise. However, there is a problem that if the mouth of the talker (user) is positioned at a null point, the voice (sound) of the talker is significantly reduced in level, making it impossible to recognize the talking voice. This is particularly so in a mobile phone 90 shown in FIG. 11 which is a schematic front view showing an example of mounting a conventional differential type microphone unit 80 in the mobile phone 90. Referring to FIG. 11, the mobile phone 90 has sound receiving openings 92a, 92b formed on one side thereof, while the differential type microphone unit 80 has first and second openings 81a, 81b which face the sound receiving openings 92a, 92b, respectively, and are placed on the same side on which the sound receiving openings 92a, 92b are placed. Such an arrangement is likely to cause a problem described above, preventing good voice quality.

There are other known microphone units in the art. For example, Japanese Laid-open Patent Publication 2007-180896 discloses a sound (audio) signal processing device with a bi-directional (first) microphone and a non-directional (second) microphone placed close to each other, in which output signals of the first and second microphones are processed to extract therefrom a signal having a predetermined correlation so as to allow the directional characteristics to be high in a narrow angular range. Japanese Patent 3620133 discloses a stereo microphone having four microphone capsules, in which output signals of the four microphone capsules are processed to obtain a stereo sound (audio) signal.

Japanese Laid-open Patent Publication 2003-44087 discloses an ambient noise reduction system with multiple microphones, in which input signals of the microphones are processed to subtract therefrom sound (audio) signals so as to estimate an ambient noise signal from the remaining signal after subtraction. A spectrum of the ambient noise signal is subtracted from a spectrum component of the input signals so as to reduce the ambient noise signal. Japanese Laid-open Patent Publication Hei 5-284588 discloses a sound (audio) signal input device having first and second microphones, in which an output signal of the second microphone is delayed and then phase-reversed. The thus phase-reversed output signal of the second microphone and the output signal of the first microphone are summed and amplified so as to cancel ambient noise. Further, Published Japanese Translation of PCT Application No. 2002-507334 discloses a noise control device having a curved reflector to deflect ambient noise so as to eliminate ambient noise. However, these known devices or systems do not solve the above problem.

SUMMARY OF THE INVENTION

An object of the present invention is to provide a microphone unit which can increase the detection sensitivity to sound emitted from a null point while reducing far-field noise.

According to the present invention, this object is achieved by a microphone unit comprising: a housing having a first opening and a second opening; and a vibratory diaphragm having a front surface and a rear surface and contained in the housing for detecting sound. Here, sound input through the first opening is guided to the front surface of the vibratory diaphragm while sound input through the second opening is guided to the rear surface of the vibratory diaphragm, so as to detect the sound by vibration of the vibratory diaphragm. The microphone unit further comprises time difference generating means for generating a difference in time between sound propagation time from the first opening to the front surface of the vibratory diaphragm and sound propagation time from the second opening to the rear surface of the vibratory diaphragm. The time difference generating means generates a difference in time so as to satisfy relation $0.76 \leqq D/\Delta r \leqq 2.0$ where D is the difference in time while $\Delta r$ is distance between the first and second openings.

The microphone unit of the present invention generates a difference in time between the sound propagation time from the first opening to the front surface of the vibratory diaphragm and the sound propagation time from the second opening to the rear surface of the vibratory diaphragm so as to position a null point at such a position that the distances therefrom to the first and second openings are different from each other. This causes the amplitude of the sound input through the first opening to be different from that input through the second opening. Consequently, the sound wave incident on the front surface of the vibratory diaphragm and the sound wave incident on the rear surface of the vibratory diaphragm based on the sound emitted from the null point are different in amplitude from each other. This difference in amplitude between the amplitudes of the sound waves incident on the front and rear surfaces of the vibratory diaphragm based on the sound emitted from the null point occurs even if the two sound waves are equal to each other in phase. Thus, the sound emitted from the null point causes a difference between sound pressures on the front and rear surfaces of the vibratory diaphragm so as to vibrate the vibratory diaphragm, preventing zero detection output for the sound emitted from the null point, so that the sound emitted from the null point can be detected by the vibration of the vibratory diaphragm.

In addition, the microphone unit generates a difference in time D which satisfies the relation $0.76 \leqq D/\Delta r \leqq 2.0$ where D is the difference in time while $\Delta r$ is distance between the first and second openings. This makes it possible to increase the detection sensitivity to the sound emitted from the null point while reducing far-field noise. Furthermore, due to the generation of the difference in time, the null point is formed at a position to cause the distances therefrom to the first and second openings to be different from each other, so that the microphone unit of the present invention can be increased in an angular range of effective sensitivity. The microphone unit of the present invention takes advantage of a differential type microphone unit which has far-field noise reduction characteristics. In addition, even when the mouth of the talker (user) is positioned at a null point, the microphone unit of the present invention can minimize the reduction in the level of the voice of the talker due to the null point, making it possible to solve the problem of unrecognizable voice (extinction of voice). Particularly when mounted in a mobile phone, the microphone unit of the present invention can advantageously achieve good voice quality.

According to the microphone unit of the present invention, the time difference generating means can be formed by a structure with a difference in length between length of a sound propagation path from the first opening to the front surface of the vibratory diaphragm and length of a sound propagation path from the second opening to the rear surface of the vibratory diaphragm.

Further, the time difference generating means can be formed by a propagation delay member provided in a sound propagation path from the first opening to the front surface of the vibratory diaphragm or in a sound propagation path from the second opening to the rear surface of the vibratory diaphragm.

Furthermore, the first and second openings can be formed on a same plane of the housing.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 1A is a schematic cross-sectional view of a microphone unit according to a first embodiment, taken along line X-X' of FIG. 1B, while

Each of FIG. 2A

FIGS. 3A to 3F are graphs in an angular coordinate system showing sensitivity characteristics, with various differences in time, of the microphone unit of the first embodiment to a far-field sound source at 500 mm;

FIGS. 4A to 4F are graphs in the angular coordinate system showing sensitivity characteristics, with various differences in time, of the microphone unit of the first embodiment to a near-field sound source at 25 mm;

FIG. 10 is a graph showing relationship between sound source distance and detection sensitivity in conventional differential type and non-directional microphone units; and FIG. 11 is a schematic front view showing an example of mounting a conventional differential type microphone unit in a mobile phone.

DESCRIPTION OF THE PREFERRED EMBODIMENTS

Figure 1A:
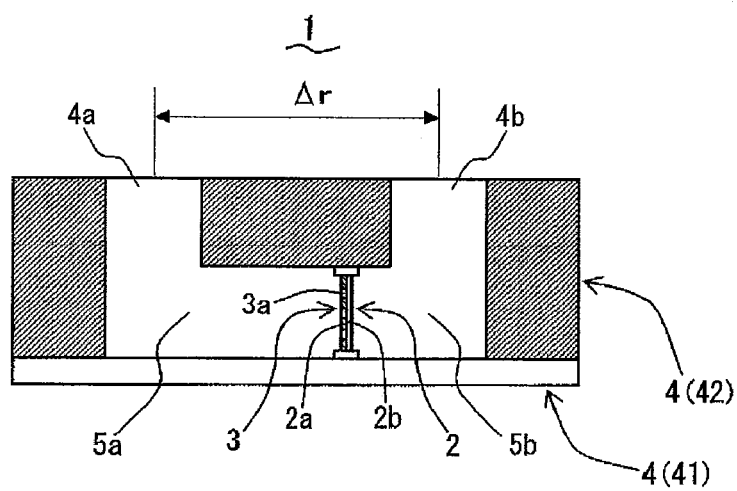

Embodiments of the present invention, as best mode for carrying out the invention, will be described hereinafter with reference to the drawings. The present invention relates to a microphone unit. It is to be understood that the embodiments herein are not intended as limiting, or encompassing the entire scope of, the invention. Note that like parts are designated by like reference numerals or characters throughout the drawings.

First Embodiment

Figure 1B:
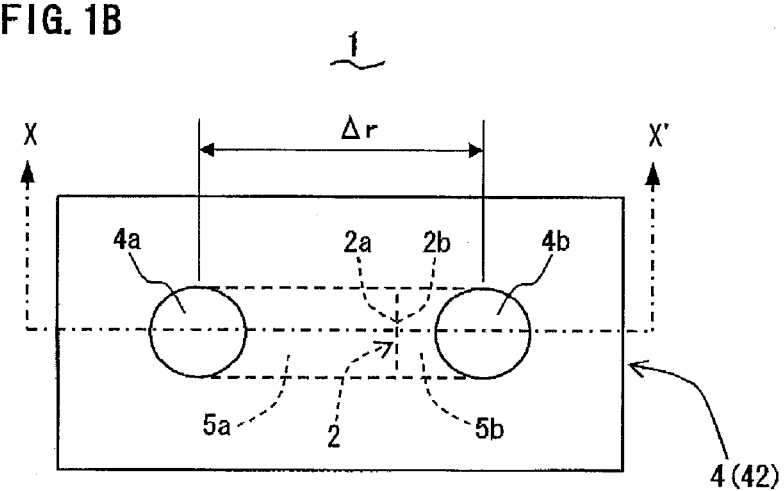
FIG. 1B is a schematic plan view, of the microphone unit according to the first embodiment of the present invention.

A microphone unit 1 according to a first embodiment of the present invention will be described with reference to FIG. 1 to FIG. 8. FIG. 1A is a schematic cross-sectional view of the microphone unit 1, taken along line X-X' of FIG. 1B, while FIG. 1B is a schematic plan view of the microphone unit 1 according to the first embodiment. The microphone unit 1 is mounted and used in a product such as a mobile phone or a hearing aid, and detects sound propagating in air (i.e. vibration of air), and further converts the detected sound to an electrical signal as an output signal. The microphone unit 1 comprises: a vibratory diaphragm 2, having a front surface 2a and a rear surface 2b, and a back electrode 3 for detecting sound; a housing 4 for containing the vibratory diaphragm 2 and the back electrode 3; and so on. The housing 4 is formed of a base 41 and a cover 42. The microphone unit 1 is of a differential type to detect sound by the vibration of the vibratory diaphragm 2 due to a difference between sound pressures on the front and rear surfaces 2a, 2b of the vibratory diaphragm 2 (i.e. difference in phase and amplitude between sound (vibrating) waves of air incident on the front and rear surfaces 2a, 2b of the vibratory diaphragm 2).

The vibratory diaphragm 2 and the back electrode 3 are placed inside the housing 4, while the back electrode 3 has multiple holes 3a formed therethrough. The housing 4 (top wall of the cover 42 of the housing 4) has a first opening 4a and a second opening 4b formed therein for allowing sound to be input therethrough. Formed inside the housing 4 are a first sound path (space) 5a connecting the first opening 4a to the front surface 2a of the vibratory diaphragm 2, and a second sound path (space) 5b connecting the second opening 4b to the rear surface 2b of the vibratory diaphragm 2. The first and second openings 4a, 4b are formed on the same plane of the housing 4 (i.e. on the same plane of the microphone unit 1). The first and second sound paths 5a, 5b are independent of each other without being connected to each other.

The vibratory diaphragm 2 and the back electrode 3 have electrical conductivity to form a capacitor therebetween. Thus, when the vibratory diaphragm 2 is vibrated, the distance between the vibratory diaphragm 2 and the back electrode 3 is changed, causing a change in electrostatic capacitance. A signal processing circuit (not shown) detects the change in electrostatic capacitance so as to detect the vibration of the vibratory diaphragm 2, and outputs an electrical signal corresponding to the vibration of the vibratory diaphragm 2. The electrical signal corresponding to the vibration of the vibratory diaphragm 2 is output as an electrical signal of sound detected by the microphone unit 1.

The vibratory diaphragm 2 and the back electrode 3 are formed as so-called MEMS (Micro Electro Mechanical System). More specifically, the vibratory diaphragm 2 and the back electrode 3 are made by applying semiconductor fine processing technology, using silicon having conductivity (e.g. by ion injection or ion implantation). The microphone unit 1 is called silicon microphones because the vibratory diaphragm 2 and the back electrode 3 are made of silicon. Due to the MEMS structure using silicon (or by forming the microphone unit 1 as a silicon microphone), it is possible to achieve a reduction in size and an increase in performance of the microphone unit 1.

Here, the length of the first sound path 5a (i.e. length of sound propagation path from the first opening 4a to the front surface 2a of the vibratory diaphragm 2) is made different from the length of the second sound path 5b (i.e. length of sound propagation path from the second opening 4b to the rear surface 2b of the vibratory diaphragm 2) so that the length of the first sound path 5a is longer than the second sound path 5b. The difference between the length of the first sound path 5a and the length of the second sound path 5b causes a difference between the sound propagation time from the first opening 4a to the front surface 2a of the vibratory diaphragm 2 and the sound propagation time from the second opening 4b to the rear surface 2b of the vibratory diaphragm 2. According to the present embodiment, the structure with the difference in length between the length of the first sound path 5a and the length of the second sound path 5b forms time difference generating means for generating a difference in time between the sound propagation time from the first opening 4a to the front surface 2a of the vibratory diaphragm 2 and the sound propagation time from the second opening 4b to the rear surface 2b of the vibratory diaphragm 2.

Now, assume that $\Delta r$ is distance between the first opening 4a and the second opening 4b, while D is difference in time between the sound propagation time from the first opening 4a to the front surface 2a of the vibratory diaphragm 2 and the sound propagation time from the second opening 4b to the rear surface 2b of the vibratory diaphragm 2 in the microphone unit 1 of the present embodiment. According to the present embodiment, the difference D is selected or designed to satisfy the relation $0.76 \leq D/\Delta r \leq 2.0$. Preferably, the distance $\Delta r$ is 5 mm or shorter in order to effectively reduce omni-directional far-field noise, and is set at $\Delta r = 5$ mm in the present embodiment.

In summary, when sound is input through both the first and second openings 4a, 4b of the microphone unit 1 with such a configuration, the sound input through the first opening 4a is guided through the first sound path 5a to the front surface 2a of the vibratory diaphragm 2, while the sound input through the second opening 4b is guided through the second sound path 5b to the rear surface 2b of the vibratory diaphragm 2. Thus, the diaphragm 2 is vibrated due to a difference between sound pressures on the front and rear surfaces 2a, 2b of the vibratory diaphragm 2 (i.e. difference in phase and amplitude between sound waves or vibrating waves of air incident on the front and rear surfaces 2a, 2b of the vibratory diaphragm 2). The vibration of the vibratory diaphragm 2 is detected by a signal processing circuit (not shown) to output an electrical signal corresponding to the vibration of the vibratory diaphragm 2. In other words, the microphone unit 1 allows sound to be input through the first opening 4a and guided to the front surface 2a of the vibratory diaphragm 2 while allowing sound to be input through the second opening 4b and guided to the rear surface 2b of the vibratory diaphragm 2 so as to detect the sound by the vibration of the vibratory diaphragm 2 (i.e. by the difference in phase and amplitude between the sound waves incident on the front and rear surfaces 2a, 2b of the vibratory diaphragm 2).

Figure 2A:
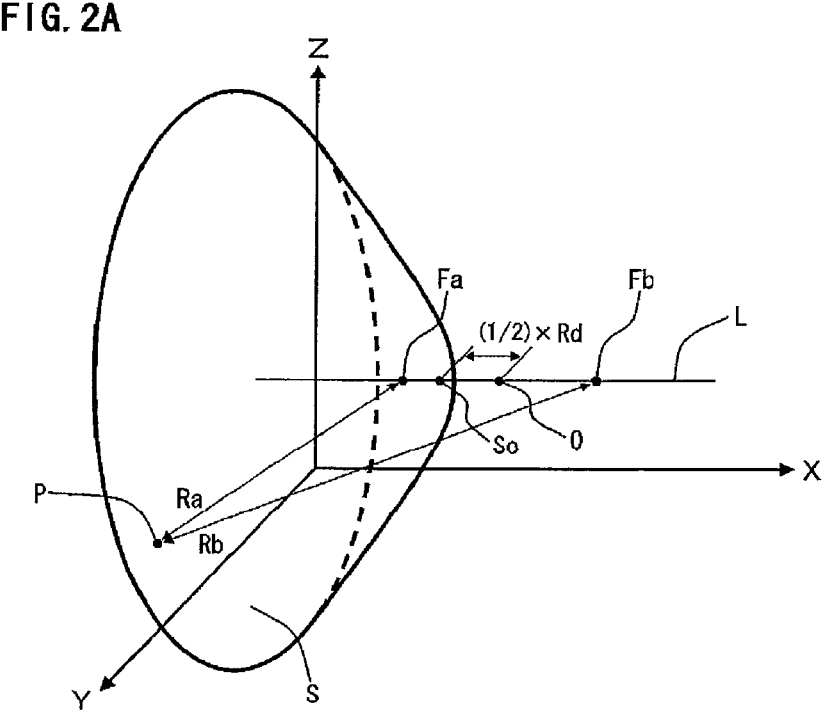
FIG. 2B is a graph showing relationship between a null point and a difference in time between sound propagation time from a first opening to a vibratory diaphragm and that from a second opening to the vibratory diaphragm.
Figure 2B:
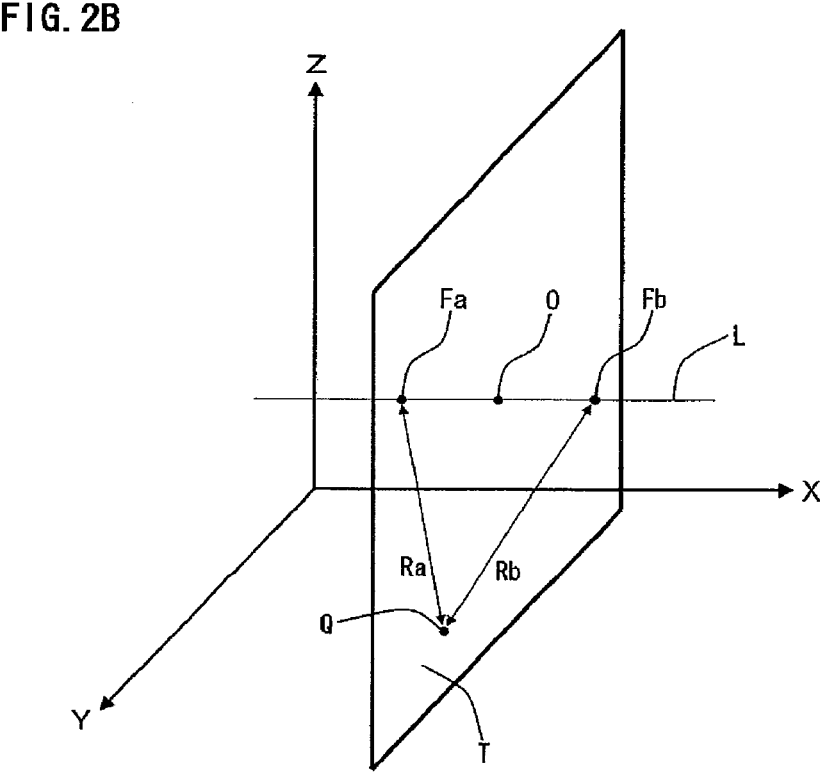

Each of FIG. 2A and FIG. 2B is a graph showing relationship between the difference in time D (difference in time between the sound propagation time from the first opening 4a to the front surface 2a of the vibratory diaphragm 2 and that from the second opening 4b to the rear surface 2b of the vibratory diaphragm 2) and a null point in the microphone unit 1. A null point is a position to cause the phase of sound incident on the front surface 2a of the vibratory diaphragm 2 to be equal to that incident on the rear surface 2b of the vibratory diaphragm 2 when sound is emitted from such a position (position of a sound source). Thus, using the difference in time D, the null point is defined as a position of a sound source where the sound propagation time to the front surface 2a of the vibratory diaphragm 2 is equal to the sound propagation time to the rear surface 2b of the vibratory diaphragm 2, i.e. where the difference in time between the sound propagation time to the first opening 4a and that to the second opening 4b is equal to the difference in time D. Thus, assuming that Rd is propagation distance of sound corresponding to the difference in time D, Ra is distance from a null point to the first opening 4a, and Rb is distance from the null point to the second opening 4b, then the position of the null point is such a position to cause the difference between the distances Ra and Rb to be Rd which is constant (Rd=Rb−Ra).

Referring to FIG. 2A, this will be described in detail below. In FIG. 2A, assuming that the positions of the first and second openings 4a, 4b are Fa, Fb, respectively, and that the midpoint between the first and second openings 4a, 4b is O, then the null point is at an arbitrary point P on a curved surface S as defined below. The curved surface S is a set (traces) of points P satisfying the equation Rd=Rb−Ra defining a rotational symmetry surface about a line segment L connecting the positions Fa, Fb as an axis, and has an apex So on the line segment L. The distance between the midpoint O and the apex So is (½)×Rd. The curvature of the curved surface S increases (decreases) with an increase (decrease) in the difference in time D and in the distance of the apex So from the midpoint O. On the other hand, as shown in FIG. 2B, when the difference in time D is 0 (zero), the null point is at an arbitrary point Q on a plane T which is a set (traces) of points Q satisfying the equation Rb−Ra=0. The plane T passes through the midpoint O and is perpendicular to the line segment L.

As described above, the microphone unit 1 of the present embodiment causes a difference in time D between the sound propagation time from the first opening 4a to the front surface 2a of the vibratory diaphragm 2 and that from the second opening 4b to the rear surface 2b of the vibratory diaphragm 2 so as to position the null point at such a position (position on the curves surface S) that the distances therefrom to the first and second openings 4a, 4b are different from each other. This causes the sound emitted from the null point to propagate a distance to the first opening 4a which is different from that to the second opening 4b while spreading out spherically (thus attenuating the amplitude of the sound according to the propagation distance), so that the amplitude of the sound input through the first opening 4a is different from that input through the second opening 4b.

If sound absorption by the wall surfaces forming the first and second sound paths 5a, 5b is neglected, the sound input through the first opening 4a is incident on the front surface 2a of the vibratory diaphragm 2 without attenuation of its amplitude, while the sound input through the second opening 4b is incident on the rear surface 2b of the vibratory diaphragm 2 also without attenuation of its amplitude. Consequently, the sounds incident on the front and rear surfaces 2a, 2b of the vibratory diaphragm 2 are different in amplitude from each other. This difference in amplitude between the sounds incident on the front and rear surfaces 2a, 2b based on the sound emitted from the null point occurs even if the sounds incident on the front and rear surfaces 2a, 2b are equal to each other in phase. Thus, the sound emitted from the null point causes a difference in sound pressures on the front and rear surfaces 2a, 2b to vibrate the vibratory diaphragm 2, so that the sound emitted from the null point can be detected by using this difference.

Figure 5:
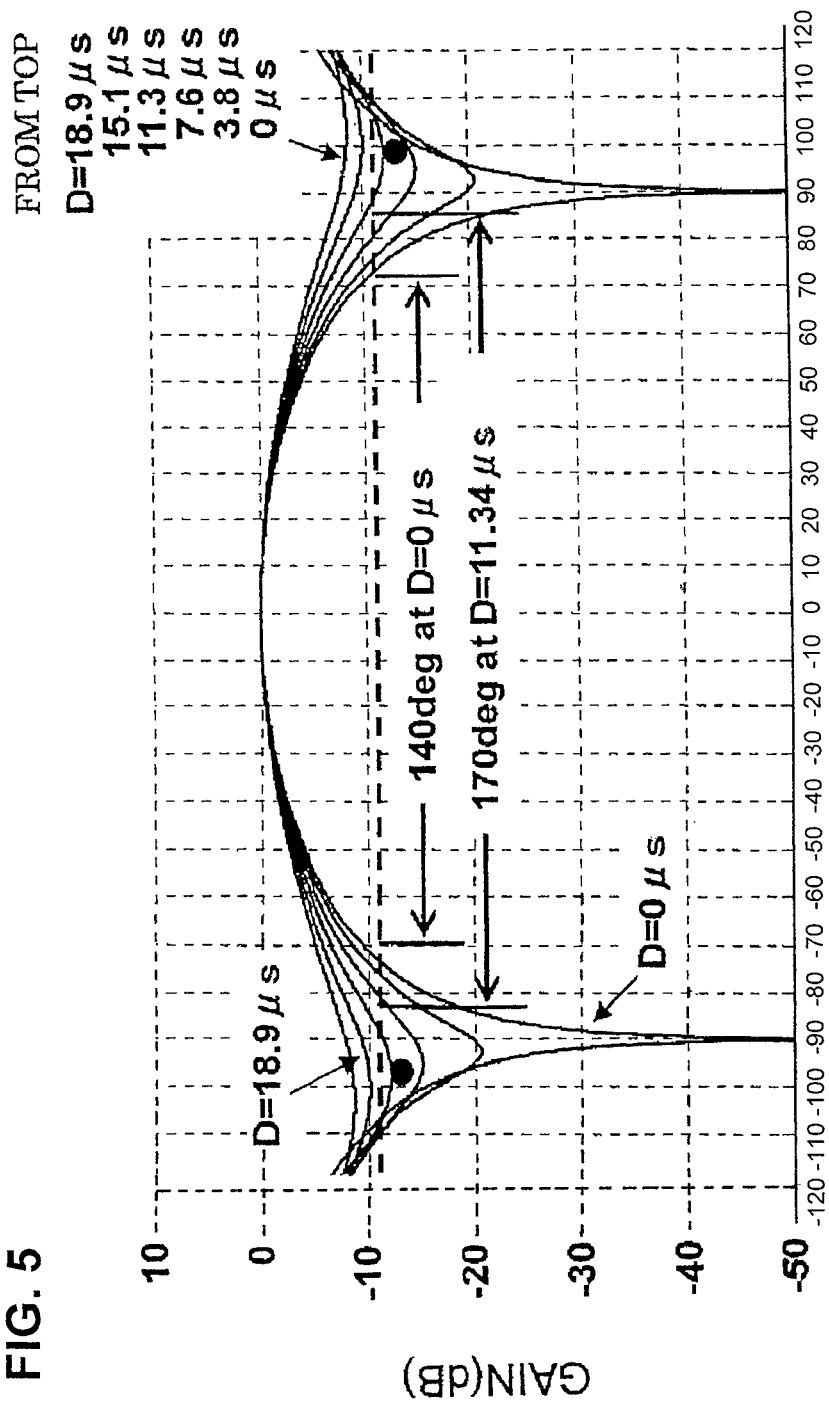
FIG. 5 is a graph in a rectangular coordinate system showing sensitivity characteristics of the microphone unit of the first embodiment which correspond to those of FIGS. 4A to 4F, as obtained by superposing the curves of FIGS. 4A to 4F in the rectangular coordinate system.

FIGS. 3A to 3F are graphs in an angular coordinate system showing sensitivity characteristics, with various differences in time D, of the microphone unit 1 of the present embodiment to a far-field sound source at 500 mm assuming far-field noise. On the other hand, FIGS. 4A to 4F are graphs in the angular coordinate system showing sensitivity characteristics, with various differences in time D, of the microphone unit 1 to a near-field sound source at 25 mm assuming a close talker. FIG. 5 is a graph in a rectangular coordinate system showing sensitivity characteristics of the microphone unit 1 which correspond to those of FIGS. 4A to 4F, as obtained by superposing the curves of FIGS. 4A to 4F in the rectangular coordinate system.

In FIGS. 3A to 3F and FIGS. 4A to 4F, the origin of the coordinate corresponds to the midpoint between the first and second openings 4a, 4b of the microphone unit 1, and the 0° direction (zero degree) of the coordinate corresponds to the direction of the second opening 4b as seen from the midpoint between the first and second openings 4a, 4b. Note that in FIG. 5, each detection sensitivity (maximum sensitivity) to sound emitted from a position in the 0° direction in FIGS. 4A to 4F is shown as 0 (zero) dB. The sensitivity characteristics of the microphone unit 1 of the present embodiment shown in FIGS. 3A to 3F, 4A to 4F and 5 are those obtained by setting the distance Δr between the first and second openings 4a, 4b at Δr=5 mm and the frequency of the sound at 1 kHz which is the fundamental frequency of the human voice.

As apparent from FIGS. 3A to 3F, in the case of the far-field sound source at 500 mm assuming far-field noise, a null point occurs at a position in the 90° direction and the 270° direction (i.e. position equidistant to the first and second openings 4a, 4b) at a difference of 0 μs in time D, and the position of the null point changes when the difference in time D is added. As the difference in time D increases, the null point moves farther away from the 90° and 270° directions and closer to the 180° direction. Furthermore, at a difference of 0 μs in time D, the detection sensitivity to the sound emitted from the null point is 0 (zero). The detection sensitivity thereto increases as the difference in time D increases, while the amount of reduction in the detection sensitivity, relative to the maximum sensitivity (detection sensitivity to the sound emitted from a position in the 0° direction), to the sound emitted from the null point decreases.

Further, as apparent from FIGS. 4A to 4F and 5, also in the case of the near-field sound source at 25 mm assuming a close talker, a null point occurs at a position in the 90° direction and the 270° direction at a difference of 0 μs in time D, and the position of the null point changes when the difference in time D is added. As the difference in time D increases, the null point moves farther away from the 90° and 270° directions and closer to the 180° direction. Furthermore, at a difference of 0 μs in time D, the detection sensitivity to the sound emitted from the null point is 0 (zero). The detection sensitivity thereto increases as the difference in time D increases, while the amount of reduction in the detection sensitivity, relative to the maximum sensitivity (detection sensitivity to the sound emitted from a position in the 0° direction), to the sound emitted from the null point decreases. Defining the angular range of detection sensitivity from the maximum sensitivity (detection sensitivity to the sound emitted from a position in the 0° direction) to −10 dB as an angular range of effective sensitivity, the angular range of effective sensitivity is 140° at a difference of 0 μs in time D. The angular range of effective sensitivity increases as the difference in time D increases, and the angular range of effective sensitivity is 170° at a difference of 11.3 μs in time D.

Figure 6:
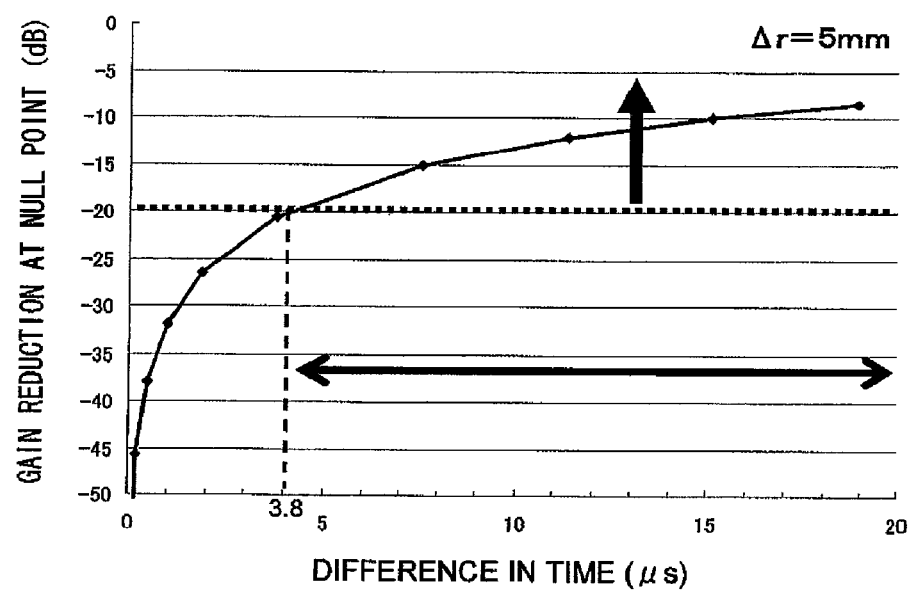
FIG. 6 is a graph showing relationship between gain reduction at a null point and difference in time between sound propagation time from the first opening to the vibratory diaphragm and that from the second opening to the vibratory diaphragm in the microphone unit of the first embodiment.

FIG. 6 is a graph showing relationship between the difference in time D and gain reduction at a null point in the microphone unit 1 in the case of the near-field sound source at 25 mm assuming a close talker. Here, the gain reduction at a null point means a reduction in the detection sensitivity, relative to the maximum sensitivity, to sound emitted from the null point, indicating that as the gain reduction at a null point decreases, the detection sensitivity to sound emitted from the null point increases. FIG. 6 shows a variation of the gain reduction at the null point with a variation of the difference in time D, in which the horizontal axis is the difference in time D, and the vertical axis is the gain reduction at the null point. Note that the absolute value of the vertical axis indicates an amount of gain reduction at the null point, indicating that as the absolute value of the vertical axis decreases, the gain reduction at the null point decreases.

The gain reduction at the null point in the microphone unit 1 shown here in FIG. 6 is a result which is obtained based on the results shown in FIGS. 4A to 4F and FIG. 5 described above. Thus, it is a result obtained by using the microphone unit 1 of the present embodiment in which the distance Δr between the first and second openings 4a, 4b is set at Δr=5 mm, and the frequency of the sound is set at 1 kHz which is the fundamental frequency of the human voice. The gain reduction at the null point is required to be 20 dB or less from a practical point of view, or more specifically, to allow a user to easily listen to and recognize the sound in view of human auditory perception.

It can be understood from the result shown in FIG. 6 that a smaller (larger) difference in time D causes an increase (decrease) in the gain reduction at a null point. A result was obtained that the gain reduction at the null point is 20 dB or less when the difference in time D is 3.8 μs or larger. Generalizing the difference in time D and the distance Δr (=5 mm) between the first and second openings 4a, 4b by dividing D by Δr, the obtained result indicates that the gain reduction at the null point is 20 dB or less if D/Δr (μs/mm) is 0.76 or higher. Similar results were obtained, indicating that even when the distance Δr between the first and second openings 4a, 4b of the microphone unit 1 of the present embodiment is set at 2 mm or 10 mm, the gain reduction at the null point is 20 dB or less if D/Δr (μs/mm) is 0.76 or higher. From these results, it is derived that D/Δr (μs/mm) is required to be 0.76 or higher in order to increase the detection sensitivity to sound emitted from the position of a null point by preventing the gain reduction at the null point from a practical point of view (the relation 0.76≦D/Δr allowing such increase in the detection sensitivity by preventing such gain reduction).

Figure 7:
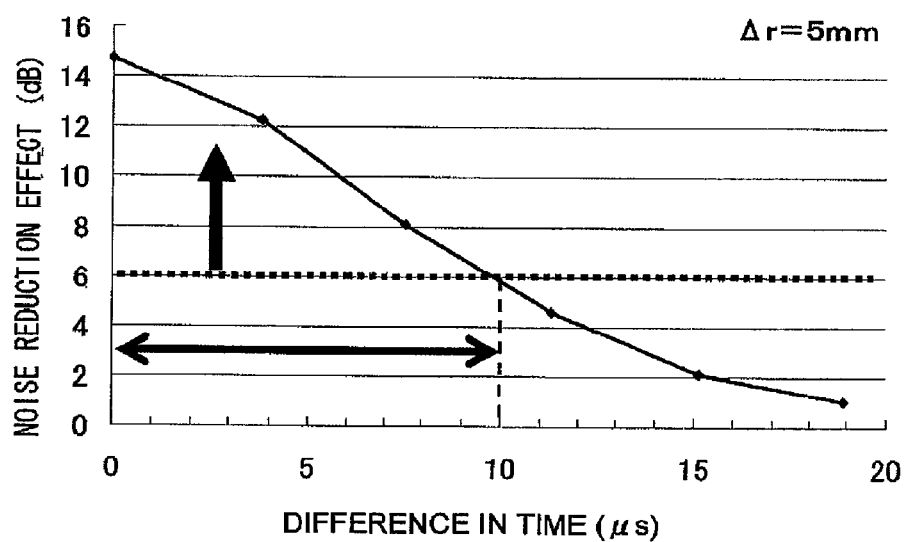
FIG. 7 is a graph showing relationship between noise reduction effect and difference in time between sound propagation time from the first opening to the vibratory diaphragm and that from the second opening to the vibratory diaphragm in the microphone unit of the first embodiment.

FIG. 7 is a graph showing relationship between the difference in time D and noise reduction effect in the microphone unit 1. Here, the noise reduction effect means an effect to reduce far-field noise (reduce the detection sensitivity to sound emitted from a position at a far distance), and more specifically corresponds to the difference between detection sensitivity to sound from a position at a near distance and that from a position at a far distance. In a general non-directional microphone unit, sound is guided to only one of the surfaces of the vibratory diaphragm with no noise reduction effect, so that the difference between the former detection sensitivity (to detect sound such as a talking voice which needs to be detected) and the latter detection sensitivity (to detect sound which is not required to be detected) is small. In contrast, in the microphone unit of the present embodiment, the difference between the former and latter detection sensitivities is superior to that in the general non-directional microphone unit as apparent from FIG. 7.

FIG. 7 shows results of measurements of the noise reduction effect which were actually made by varying the difference in time D, in which the horizontal axis is difference in time D while the vertical axis is noise reduction effect, indicating that as the value of the vertical axis increases, the noise reduction effect increases. Note that the measurements of the noise reduction effect were made by using the microphone unit 1 of the present embodiment in which the distance Δr between the first and second openings 4a, 4b is set at Δr=5 mm, and also a conventional non-directional microphone for comparison, and by placing the microphone units in an actual noise environment.

Note that the noise reduction effect is required to be 6 dB or more from a practical point of view, more specifically, to allow a user to feel in view of human auditory perception that the noise is effectively reduced. It can be understood from the results of actual measurements shown in FIG. 7 that a smaller (larger) difference in time D causes an increase (decrease) in the noise reduction effect. A result of actual measurement was obtained that a noise reduction effect of 6 DB or more can be obtained when the difference in time D is 10 μs or smaller. Generalizing the difference in time D and the distance Δr (=5 mm) between the first and second openings 4a, 4b by dividing D by Δr, the obtained result of actual measurement indicates that a noise reduction effect of 6 DB or more can be obtained if D/Δr (μs/mm) is 2.0 or lower. Similar results of actual measurements were obtained, indicating that even when the distance Δr between the first and second openings 4a, 4b of the microphone unit 1 is set at 2 mm or 10 mm, the noise reduction effect is 6 dB or more if D/Δr (μs/mm) is 2.0 or lower. From these results, it is derived that D/Δr (μs/mm) is required to be 2.0 or lower in order to obtain a noise reduction effect to reduce far-field noise from a practical point of view (the relation D/Δr≦2.0 allowing such noise reduction effect to reduce far-field noise).

As understood from the above, in the microphone unit 1 of the present embodiment, it is important to generate a difference in time D which satisfies the relation 0.76≦D/Δr≦2.0. The microphone unit 1 of the present embodiment makes it possible to reduce far-field, noise based on the relation D/Δr≦2.0, while it can increase the detection sensitivity to sound emitted from the position of a null point based on the relation 0.76≦D/Δr. Thus, the microphone unit 1 of the present embodiment can increase the detection sensitivity to sound emitted from the null point, while reducing far-field noise, by generating a difference in time D which satisfies the relation 0.76≦D/Δr≦2.0.

As described above, according to the microphone unit 1 of the present embodiment, the generation of a difference in time D causes the position of a null point to be differently distanced from the first and second openings 4a, 4b. In order to determine an angular range of effective sensitivity in this regard, actual measurements were also made by placing the microphone unit 1 at various positions to measure the detection sensitivities to sound emitted from the position of a null point and from positions other than the position of the null point. The results of the actual measurements indicate that the sound emitted from the positions other than the position of the null point can be detected at high sensitivity. This indicates that the microphone unit 1 of the present embodiment can have an increased angular range of effective sensitivity.

As described in the foregoing, the microphone unit 1 of the present embodiment makes it possible to increase the detection sensitivity to sound emitted from a null point, while reducing far-field noise, and increase the angular range of effective sensitivity. In other words, the microphone unit 1 of the present embodiments takes advantage of a differential type microphone unit which has far-field noise reduction characteristics, and at the same time solves the problem of voice level reduction at a null point. More specifically, even when the mouth of the talker (user) is positioned at a null point, the microphone unit 1 can minimize the reduction in the level of the voice of the talker due to the null point, making it possible to solve the problem of unrecognizable voice (extinction of voice). Particularly when mounted in a mobile phone, the microphone unit 1 can advantageously achieve good voice quality.

Figure 8:
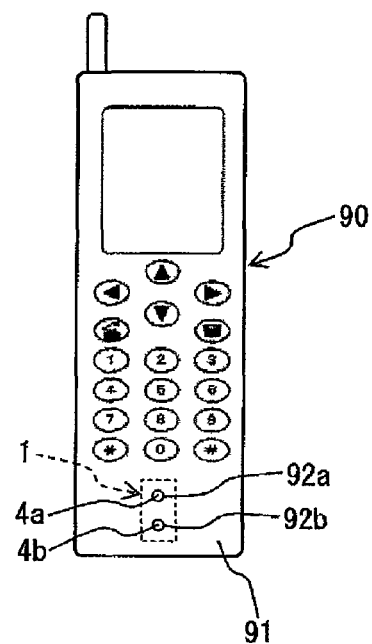
FIG. 8 is a schematic front view showing an example of mounting the microphone unit of the first embodiment in a mobile phone.

FIG. 8 is a schematic front view showing an example of mounting the microphone unit 1 of the present embodiment in a mobile phone 90. Referring to FIG. 8, the microphone unit 1 of the present embodiment is mounted, for example, in a mobile phone 90 having a housing 91 which has sound receiving openings 92*a*, 92*b* formed on one side thereof (facing a user or talker), while the first and second openings 4*a*, 4*b* face the sound receiving openings 92*a*, 92*b*, respectively, and are placed on the same side on which the sound receiving openings 92*a*, 92*b* are placed. When the microphone unit 1 is mounted in the mobile phone 90 in this manner, null points occur in the direction of the talker (on the talker side). Even when mounted in the mobile phone 90 in this manner (even when a null point occurs in the direction of the talker), the microphone unit 1 of the present embodiment can increase the detection sensitivity to sound emitted from the null point, and increase the angular range of effective sensitivity, making it possible to solve the problem of unrecognizable voice (extinction of voice) and achieve good voice quality.

Second Embodiment

Figure 9:
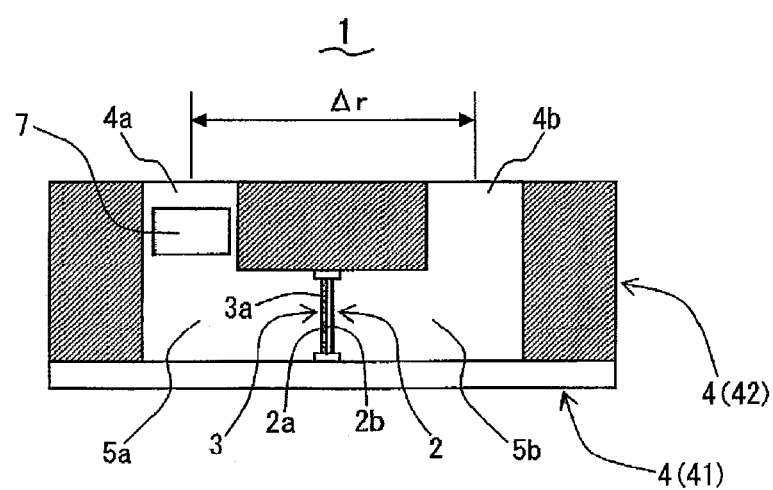
FIG. 9 is a schematic cross-sectional view of a microphone unit of a second embodiment of the present embodiment.

A microphone unit 1 according to a second embodiment of the present invention will be described with reference to FIG. 9, which is a schematic cross-sectional view of a microphone unit 1 of the present embodiment. The microphone unit 1 of the present embodiment is the same as that of the first embodiment, except that it further comprises a propagation delay member 7 for delaying the propagation of sound, and that the length of the first sound path 5*a* is equal to that of the second sound path 5*b*. The propagation delay member 7 is formed, for example, of a material such as felt, and delays sound (delays sound propagation) without attenuating the amplitude of the sound. The propagation delay member 7 is provided in the first sound path 5*a* (i.e. in the sound propagation path from the first opening 4*a* to the front surface 2*a* of the vibratory diaphragm 2). In the microphone unit 1 of the present embodiment, the propagation delay member 7 serves to generate a difference in time between the sound propagation time from the first opening 4*a* to the front surface 2*a* of the vibratory diaphragm 2 and that from the second opening 4*b* to the rear surface 2*b* of the vibratory diaphragm 2. Thus, the propagation delay member 7 forms time difference generating means for generating a difference in time between the two sound propagation times.

Now, assume that in the microphone unit 1 of the present embodiment, $\Delta r$ is distance between the first opening 4*a* and the second opening 4*b*, while D is difference in time between the sound propagation time from the first opening 4*a* to the front surface 2*a* of the vibratory diaphragm 2 and that from the second opening 4*b* to the rear surface of the vibratory diaphragm 2. In the present embodiment, the propagation delay member 7 is selected or designed to satisfy the relation $0.76 \leq D/\Delta r \leq 2.0$. The microphone unit 1 of the present embodiment having such design or configuration has similar functions and effects to those of the microphone unit of the first embodiment.

It is to be noted that the present invention is not limited to the above embodiments, and various modifications are possible within the spirit and scope of the present invention. For example, in the first embodiment described above, it is possible to make the length of the second sound path longer than that of the first sound path instead of making the length of the first sound path longer than that of the second sound path. Further, in the second embodiment, the propagation delay member can be provided in the second sound path instead of providing it in the first sound path. In addition, in the first and second embodiments, the microphone unit to be used is not limited to one formed by a vibratory diaphragm and a back electrode as a MEMS (silicon microphone), but can be of an electret capacitor type in which the vibratory diaphragm is formed of an electret diaphragm (dielectric body with residual polarization). It can also be a microphone unit of an electrodynamic, electromagnetic or piezoelectric (crystal) type. Moreover, in the first and second embodiments, the first and second openings can be formed on different planes of the housing (or of the microphone unit). Such an arrangement also makes it possible to obtain similar functions and effects as in the first and second embodiments.

In the first and second embodiments, the first and second openings are formed on the same plane of the housing (same plane of the microphone unit). This is because when the microphone unit with such configuration is mounted in a mobile phone so as to allow the surface or plane having the first and second openings formed thereon to face a talker of the mobile phone, null points are likely to occur in the direction of the talker (on the talker side). The technology of the present invention can be applied not only to a microphone unit having first and second openings formed on the same plane of the housing, but also to a microphone having the first and second openings formed on different planes of the housing (different planes of the microphone unit), so as to achieve similar effects as in the first and second embodiments.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2009-055605 filed Mar. 9, 2009, the content of which is hereby incorporated by reference.

What is claimed is:

1. A microphone unit comprising:
   a housing having a first opening and a second opening; and
   a vibratory diaphragm having a front surface and a rear surface and contained in the housing for detecting sound,
   wherein sound input through the first opening is guided to the front surface of the vibratory diaphragm while sound input through the second opening is guided to the rear surface of the vibratory diaphragm, so as to detect the sound by vibration of the vibratory diaphragm,
   wherein the microphone unit further comprises time difference generating means for generating a difference in time between sound propagation time from the first opening to the front surface of the vibratory diaphragm and sound propagation time from the second opening to the rear surface of the vibratory diaphragm, and wherein the time difference generating means generates a difference in time so as to satisfy the relation $0.76 \leq D/\Delta r \leq 2.0$ where D is the difference in time while $\Delta r$ is distance between the first and second openings, wherein the time difference generating means is formed by a structure with a difference in length between length of a sound propagation path from the first opening to the front surface of the vibratory diaphragm and length of a sound propagation path from the second opening to the rear surface of the vibratory diaphragm.

2. The microphone unit according to claim 1,
wherein the first and second openings are formed on a same plane of the housing.

3. A microphone unit comprising:
a housing having a first opening and a second opening; and
a vibratory diaphragm having a front surface and a rear surface and contained in the housing for detecting sound,
wherein sound input through the first opening is guided along a first sound propagation path from the first opening to the front surface of the vibratory diaphragm, and sound input through the second opening is guided along a second sound propagation path from the second opening to the rear surface of the vibratory diaphragm, so as to detect the sound by vibration of the vibratory diaphragm, and wherein the first sound propagation path and second sound propagation path have different lengths such that the first sound propagation path and the second sound propagation path have different sound propagation times, and wherein the sound propagation times of the first sound propagation path and the second sound propagation path satisfy the relation of $0.76 \leq D/\Delta r \leq 2.0$, where D is the difference in times and $\Delta r$ is a distance between the first opening and the second opening.

4. A microphone unit comprising:
a housing having a first opening and a second opening; and
a vibratory diaphragm having a front surface and a rear surface and contained in the housing for detecting sound,
wherein sound input through the first opening is guided along a first sound propagation path from the first opening to the front surface of the vibratory diaphragm, and sound input through the second opening is guided along a second sound propagation path from the second opening to the rear surface of the vibratory diaphragm, so as to detect the sound by vibration of the vibratory diaphragm, and wherein the first sound propagation path and second sound propagation path have different lengths such that the first sound propagation path and the second sound propagation path have different sound propagation times, and wherein the sound propagation times of the first sound propagation path and the second sound propagation path satisfy the relation of $0.76 \leq D/\Delta r \leq 2.0$, where D is the difference in times and $\Delta r$ is a distance between the first opening and the second opening, wherein the first and second openings are formed on a same plane of the housing.

* * * * *